(12) United States Patent
Huang et al.

(10) Patent No.: US 6,859,316 B1
(45) Date of Patent: Feb. 22, 2005

(54) OPTICAL POLARIZATION BEAM COMBINER/SPLITTER

(75) Inventors: Yonglin Huang, San Jose, CA (US); Ping Xie, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/702,280

(22) Filed: Oct. 30, 2000

Related U.S. Application Data

(62) Division of application No. 09/365,680, filed on Aug. 2, 1999, now Pat. No. 6,282,025.

(51) Int. Cl.$^7$ .................................................. G02B 5/30
(52) U.S. Cl. ...................... 359/494; 359/483; 359/495; 359/496; 359/497; 359/500
(58) Field of Search ................................ 359/483, 494, 359/495–497, 500; 385/11

(56) References Cited

FOREIGN PATENT DOCUMENTS

JP            04335304     * 11/1992

* cited by examiner

Primary Examiner—Audrey Chang
Assistant Examiner—Craig Curtis
(74) Attorney, Agent, or Firm—Workman Nydegger

(57) ABSTRACT

An optical polarization beam splitter comprises a first optical fiber having an end defining a first optical axis, a second optical fiber having an end defining a second optical axis, and a third optical fiber having an end defining a third optical axis parallel to and spaced apart from the second optical axis. A collimating lens is disposed along the first optical axis positioned to form a collimated optical beam from the first optical fiber. A focussing lens is disposed along a path of the collimated optical beam. A birefringent walk-off crystal has a first face adjacent to the focussing lens and a second face located at a focal plane of the focussing lens and in contact with the ends of the second and third optical fibers. The birefringent crystal is oriented such that and has a thickness between its first and second faces selected such that a first component of the optical beam having a first polarization exits the crystal at its second face and enters the end of the second optical fiber along the second optical axis and a second component of the optical beam having a second polarization orthogonal to the polarization of the first polarization exits the crystal at its second face and enters the end of the third optical fiber along the third optical axis.

24 Claims, 6 Drawing Sheets

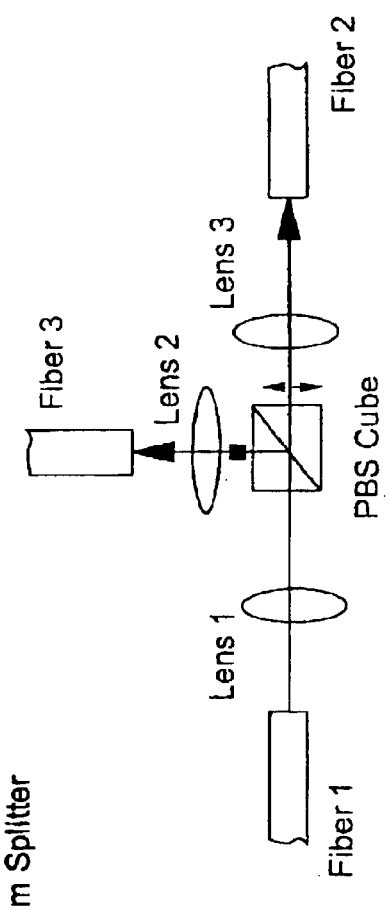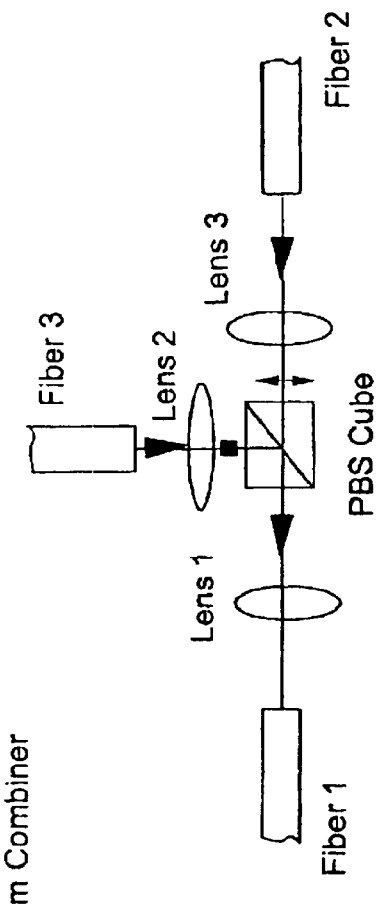

OPTICAL POLARIZATION BEAM COMBINER/SPLITTER

BACKGROUND OF THE INVENTION

This application is a Divisional Application of Ser. No. 09/365,680, filed Aug. 2, 1999, now U.S. Pat. No. 6,282,025.

FIELD OF THE INVENTION

The Prior Art

Optical polarization beam splitter/combiners are known in the art. These devices may be used in optical communication in many ways including, but not limited to, optical power multipliers for combining two optical pump beams to increase optical pumping power, in coherent optical communications applications, and as optical polarization division multiplexers.

Two examples of prior art optical polarization beam splitter/combiners are shown in FIGS. 1A and 1B and FIGS. 2A and 2B, respectively. In the optical polarization beam splitter of FIG. 1A, an input beam enters from the fiber located at the left side of the figure. For the beam splitting operation, the incoming beam from fiber 1 at the left is collimated by the lens 1, and then enters the optical polarization beam splitter cube. The optical polarization beam splitter cube is able to split an arbitrary polarized light into two separated beams with orthogonally polarized directions. A first beam exits to the right and is coupled to fiber 2 through lens 2. A second beam exits in an upward direction and is coupled to fiber 3 through lens 3. In this way, an optical polarization beam splitter is realized. These three fibers could each be a single mode fiber, a polarization maintaining (PM) fiber, or even a multi-mode fiber.

The prior-art device depicted in FIG. 1A may be used as a bi-directional device if fiber 2 and fiber 3 are PM fibers, such that the optical beam polarization states coming from these two fibers are well defined and orthogonal to each other. Then these two beams can be added together at fiber 1 as shown in FIG. 1B. In this way, an optical polarization beam combiner is realized.

The device depicted in FIGS. 1A and 1B functions for its intended purpose. It however, suffers from several disadvantages, such as a larger device size necessitated by the need to employ an orthogonally disposed beam, suffer from a low extinction ratio, difficult to manage the fibers.

A second prior-art embodiment of an optical polarization beam combiner/splitter is depicted in FIGS. 2A and 2B. The optical principles of operation of the embodiment of FIGS. 2A and 2B are almost the same as those of FIGS. 1A and 1B.

Referring to FIG. 2A, a birefringent crystal is used to split the incoming arbitrary polarization light focussed from fiber 1 by lens 1 into two parallel beams having orthogonal polarization directions. These two beams are focused into fiber 2 and fiber 3, respectively, by lenses 2 and 3, such that the optical polarization beam splitter is realized. As shown in FIG. 2B, an optical polarization beam combiner can be realized as well. Compared to the embodiments of FIGS. 1A and 1B, the approach of FIGS. 2A and 2B provides high extinction ratio, employs fewer optical parts, and could be manufactured without the use of an optical epoxy in the optical path.

The device depicted in FIGS. 2A and 2B has its own drawbacks. Since fiber 2 and fiber 3 are located at the same side of the device, the birefringent crystal must have a length sufficient separate the two beams enough to accommodate the required spacing between lenses 2 and 3. Typically, lenses for this application have diameters of around 1.8 mm, requiring the minimum spacing between lens axes to also be about 1.8 mm. A birefringent must have a length of about 18 mm to provide the required beam separation of at least about 1.8 mm to accommodate the placement of lenses 2 and 3.

BRIEF DESCRIPTION OF THE INVENTION

An optical polarization beam splitter according to one embodiment of the present invention comprises a first optical fiber having an end defining a first optical axis, a second optical fiber having an end defining a second optical axis, and a third optical fiber having an end defining a third optical axis parallel to and spaced apart from the second optical axis. A collimating lens is disposed along the first optical axis positioned to form a collimated optical beam from the first optical fiber. A focussing lens is disposed along a path of the collimated optical beam. A birefringent walk-off crystal has a first face adjacent to the focussing lens and a second face located at a focal plane of the focussing lens and in contact with the ends of the second and third optical fibers. The birefringent crystal is oriented such that and has a thickness between its first and second faces selected such that a first component of the optical beam having a first polarization exits the crystal at its second face and enters the end of the second optical fiber along the second optical axis and a second component of the optical beam having a second polarization orthogonal to the polarization of the first polarization exits the crystal at its second face and enters the end of the third optical fiber along the third optical axis.

An optical polarization beam splitter according to another embodiment of the present invention comprises a first optical fiber having an end defining a first optical axis, a second optical fiber having an end defining a second optical axis, and a third optical fiber having an end defining a third optical axis parallel to and spaced apart from the second optical axis. A collimating lens is disposed along the first optical axis and is positioned to form a collimated optical beam from the first optical fiber. A birefringent walk-off crystal is disposed in a path of the collimated optical beam. The crystal is oriented such that and has a thickness between first and second faces thereof selected such that a first component of the optical beam having a first polarization transits the crystal along a first path and a second component of the optical beam having a second polarization orthogonal to that of the first polarization transits the crystal along a second path disposed at a walkoff angle with respect to the first path. The first and second paths exit the second face of the crystal as substantially parallel first and second paths. A Wollaston prism (a pair of wedges) is disposed along the substantially parallel first and second paths and oriented such as to bend the substantially parallel first and second paths towards each other to form converging first and second paths. A focussing lens is disposed along the converging first and second paths and positioned such that a first component optical beam travelling along the first converging path is directed into the end of the second optical fiber along the second optical axis and a second component optical beam travelling along the second converging path is directed into the end of the third optical fiber along the third optical axis.

An optical polarization beam splitter according to another embodiment of the present invention comprises a first optical fiber having an end defining a first optical axis, a second optical fiber having an end defining a second optical axis, and a third optical fiber having an end defining a third optical axis parallel to and spaced apart from the second optical axis. A collimating lens is disposed along the first optical axis and is positioned to form a collimated optical beam from the first optical fiber. A first Wollaston prism is disposed in a path of the collimated optical beam and oriented such that a first component of the optical beam having a first polarization transits the prism along a first path disposed at a first angle with respect to the first optical axis and a second component of the optical beam having a second polarization orthogonal to that of the first polarization transits the prism along a second path disposed at a second angle with respect to the first optical axis, the first and second angles being substantially symmetrical about the first optical axis. A second Wollaston prism is disposed along the first and second paths and oriented such as to bend the first and second paths towards each other to form converging first and second paths. A focussing lens is disposed along the converging first and second paths and positioned such that a first component optical beam travelling along the first converging path is directed into the end of the second optical fiber along the second optical axis and a second component optical beam travelling along the second converging path is directed into the end of the third optical fiber along the third optical axis.

An optical polarization beam splitter according to another embodiment of the present invention comprises a first optical fiber having an end defining a first optical axis, a second optical fiber having an end defining a second optical axis, and a third optical fiber having an end defining a third optical axis parallel to and spaced apart from the second optical axis. The second and third optical axes are symmetrical about the first optical axis. A first focussing lens is disposed along the first optical axis. A Wollaston prism is disposed at a location along the first optical axis where a focal point of the first focussing lens lies on an interface between two component pieces of the prism wedge such that a first component of an optical beam from the first optical fiber having a first polarization is directed along a first path disposed at a first angle with respect to the first optical axis and a second component of the optical beam having a second polarization orthogonal to that of sa the id first polarization is directed along a second path disposed at a second angle with respect to the first optical axis, the first and second angles being substantially symmetrical about the first optical axis. A second focussing lens is disposed along the first and second paths at a location selected to focus a first component optical beam into the end of the second optical fiber to focus a second component optical beam into the end of the third optical fiber.

BRIEF DESCRIPTION OF THE DRAWING FIGURES

FIGS. 1A and 1B are optical block diagrams of a first typical prior-art device useful as both a beam combiner and beam splitter.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 2A:
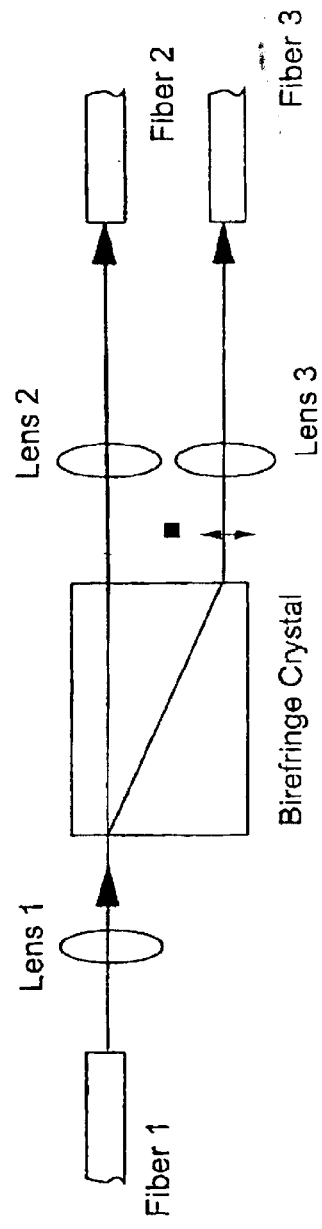
FIGS. 2A and 2B are optical block diagrams of a second typical prior-art beam useful as both a beam combiner and beam splitter.
Figure 2B:
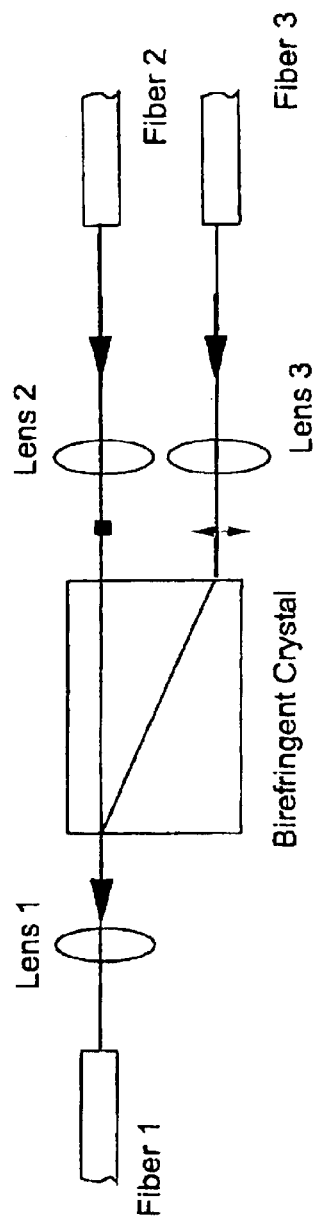
Figure 3:
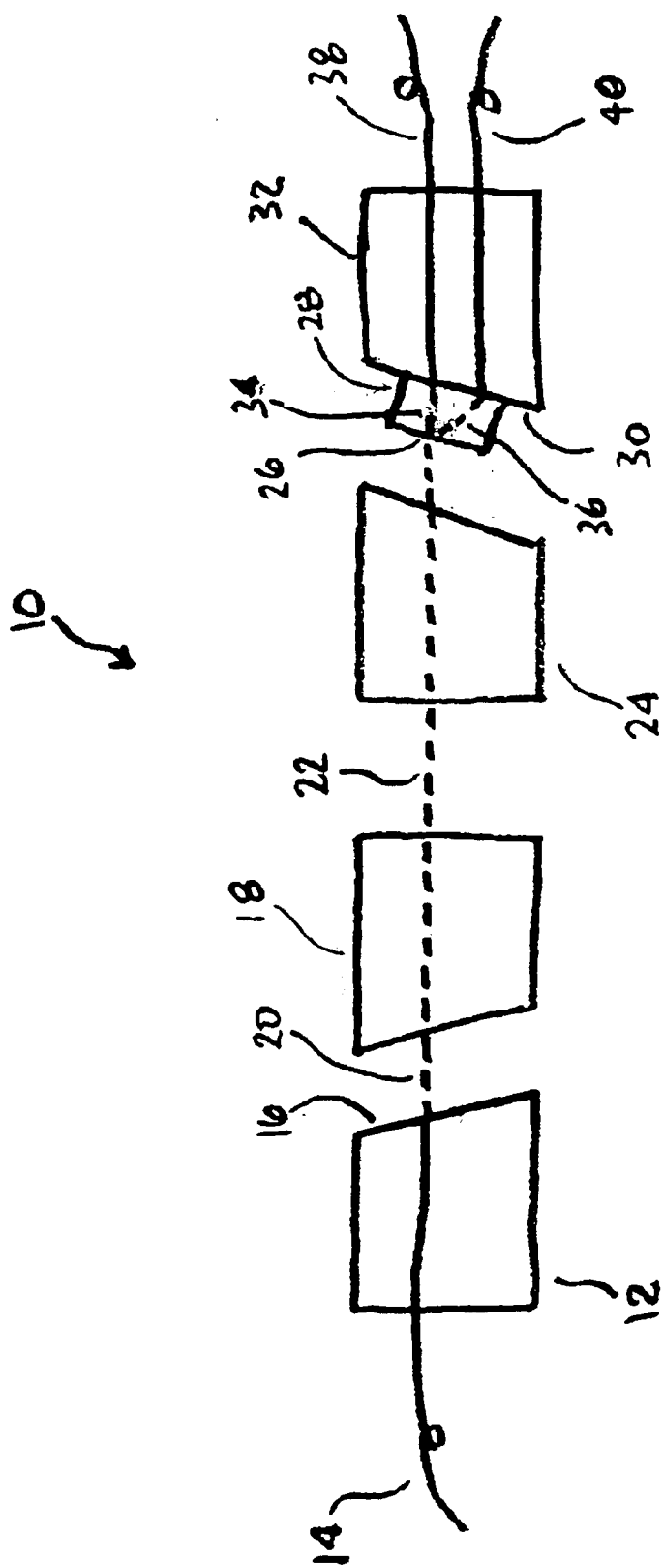
FIG. 3 is an optical block diagram of an optical polarization beam combiner/splitter in accordance with a first embodiment of the invention.

Referring now to FIG. 3, an optical block diagram of an embodiment of an optical polarized beam combiner/splitter 10 according to the present invention is shown. A first fiber ferrule 12 terminates fiber 14 at an angled face 16 thereof. Angled face 16 may be polished to an angle of about 8° to 10° as is the end of fiber 14, as is known in the art to avoid deleterious effects from internal reflections in the optical fiber. Fiber 14 carries a combined optical beam having a first component polarized in a first direction and a second optical beam polarized in a second direction orthogonal to the first direction. Fiber ferrule 12 may have a length in the optical path direction of about 4 mm.

A first lens 18 may be spaced apart from fiber ferrule 12 by about 1 mm, may have a length in the optical path direction of about 3 mm and collimates the combined beam 20 emerging from the end of fiber 14 to produce a collimated combined beam 22. A second lens 24 may be spaced apart from first lens 18 by a distance of about 2 mm, may have a length in the optical path direction of about 3 nun and focuses the collimated combined beam 22 at a focal point 26 on a first face of birefringent walkoff crystal 28. As presently preferred, both lens 18 and lens 24 may be graduated-index-of-refraction (GRIN) lenses, although conventional lenses may also be employed. Persons of ordinary skill in the art will appreciate that two separate lenses 18 and 24 are employed to perform the collimating and focussing functions to minimize the introduction of spherical aberrations.

Birefringent walkoff crystal 28 is disposed at an angled face 30 of a ferrule 32. A first component beam 34 from fiber 14 passes through birefringent walk-off crystal 28 without refraction and a second component beam 36 passes through birefringent walk-off crystal 28 after being refracted at an downward angle. The thickness of birefringent walk-off crystal 28 is selected so that the paths of beams 34 and 36 walk off from one another by a distance selected to match the spacing between optical fibers 38 and 40 held in ferrule 32. Birefringent walk-off crystal 28 may be comprised of a material such as $YVO_4$, $LiNbO_3$, etc. Typical thicknesses for birefringent walk-off crystal 28 are in the range of from about 1 mm to about 2 mm and the distance between second lens 24 and ferrule 32 may be between about 1 mm to 2 mm. As those of ordinary skill in the art will appreciate, changing the incident angle of the birefringent walk-off crystal 28 will change the walk-off distance.

From an examination of FIG. 3 persons of ordinary skill in the art will appreciate that an improved optical polarizing beam combiner/splitter has been described. Because the optical paths in optical polarizing beam combiner/splitter 10 are all substantially parallel to a single optical axis, it can be packaged in a small, compact coaxial package, thus allowing for a smaller footprint and providing an improved ease in fiber management. Furthermore, the combination of optical components utilized in the embodiment of FIG. 3 permits close spacing of the two parallel-axis component beams and avoids the use of longer walk-off distances that would otherwise be required to provide sufficient beam spacing to accommodate the physical sizes of the optical components. For example, by using the optical components of the present invention, the two parallel axis component beams may be spaced apart by as little as 0.125 mm (125 microns). In addition, the entire length of the splitter/combiner in the illustrative embodiment of FIG. 3 is less than about 18 mm to about 20 mm.

Persons of ordinary skill in the art will appreciate that the device of FIG. 3 has been described by following the optical path from left to right across the figure and performs the function of a beam splitter. Such skilled persons will appreciate that two oppositely polarized optical beams emerging from fibers 38 and 40 on the right and travelling in the direction from right to left across the drawing figure will be combined and directed into fiber 14 at the left of FIG. 3 in accordance with the principles of the present invention, so long as optical fibers 38 and 40 are PM fibers.

Figure 4:
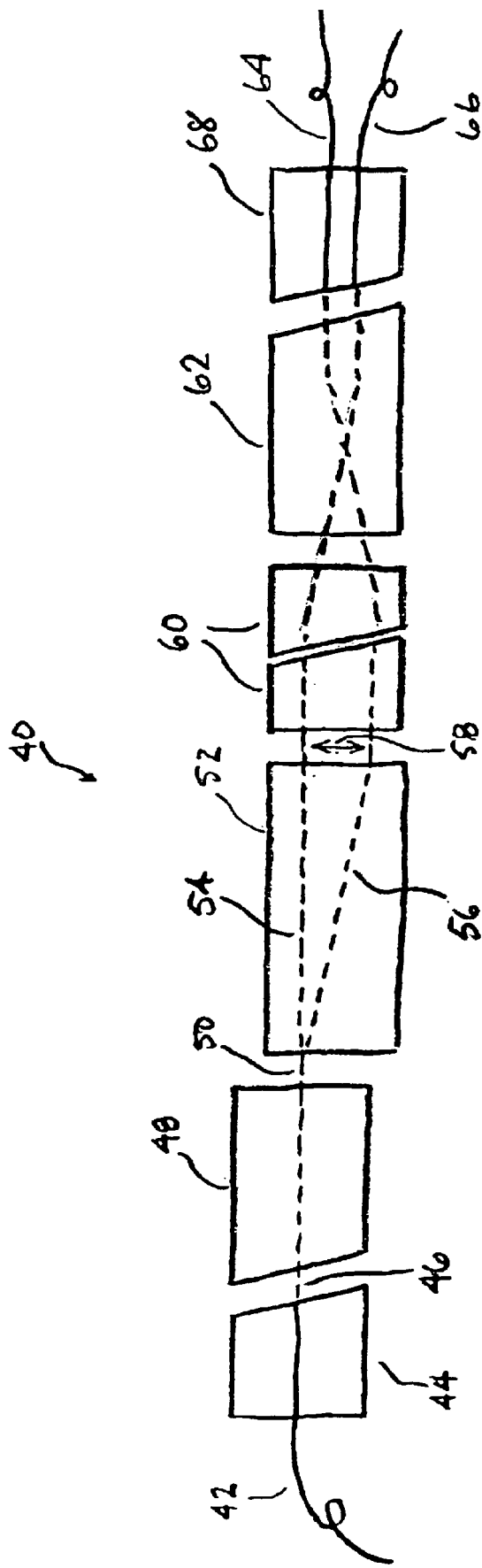
FIG. 4 is an optical block diagram of an optical polarization beam combiner/splitter in accordance with a second embodiment of the invention.

Referring now to FIG. 4, an optical block diagram of another embodiment of an optical polarized beam combiner/splitter 40 according to the present invention is shown.

The embodiment of FIG. 4 has been described for an orientation wherein a coincident beam having two components enters from optical fiber 42 at the left of the figure and is split into two component beams which emerge at the right side of the figure, but persons of ordinary skill in the art will appreciate that the analysis of two component beams entering the combiner/splitter from the right and being combined and directed into optical fiber 42 according to the present invention follows from the same optical principles described as responsible for beam splitting, so long as the optical fibers delivering the two component beams are polarization maintaining fibers.

Optical fiber 42 is disposed in ferrule 44 as is known in the art and is end polished at an angle as is known in the art. Diverging composite optical beam 46 from the end of optical fiber 42 is collimated by collimating lens 48 and collimated composite optical beam 50 enters birefringent walkoff crystal 52. A first optical beam component transits crystal 52 on beam path 54 and a second optical beam component transits crystal 52 on beam path 56 at a walkoff angle with respect to beam path 54. The length of birefringent crystal 52 is selected to provide a selected walkoff distance indicated by double-headed arrow 58 between the two component optical beams. In the illustrative embodiment of FIG. 4, the ferrule 44 may have a length of about 4 mm, the collimating lens 48 may be spaced from ferrule 44 by about 0.1 mm, and may have a length in the optical path direction of about 5 mm. The birefringent crystal 52 may have a length of about 10 mm, and may be spaced from collimating lens 48 by about 0.2 mm.

A Wollaston prism 60 is disposed in the paths of optical beams 54 and 56 to bend the propagation directions of optcal beams 54 and 56 so that they may be focussed by lens 62 such that they enter optical fibers 64 and 66, respectively, disposed in ferrule 68. As presently preferred, lens 62 comprises a GRIN lens, although a conventional lens may also be employed. In the illustrative embodiment of FIG. 4, the Wollaston prism 60 may have a length of about 4 mm, and may be spaced from birefringent crystal 52 by about 0.2 mm. Lens 62 may have a length of about 5 mm, and may be spaced from Wollaston prism 60 by about 0.2 mm. Ferrule 68 may have a length of about 4 mm, and may be spaced from lens 62 by about 0.1 mm. The entire length of the splitter/combiner in the illustrative embodiment of FIG. 4 is less than about 30 mm to about 40 mm.

Figure 5:
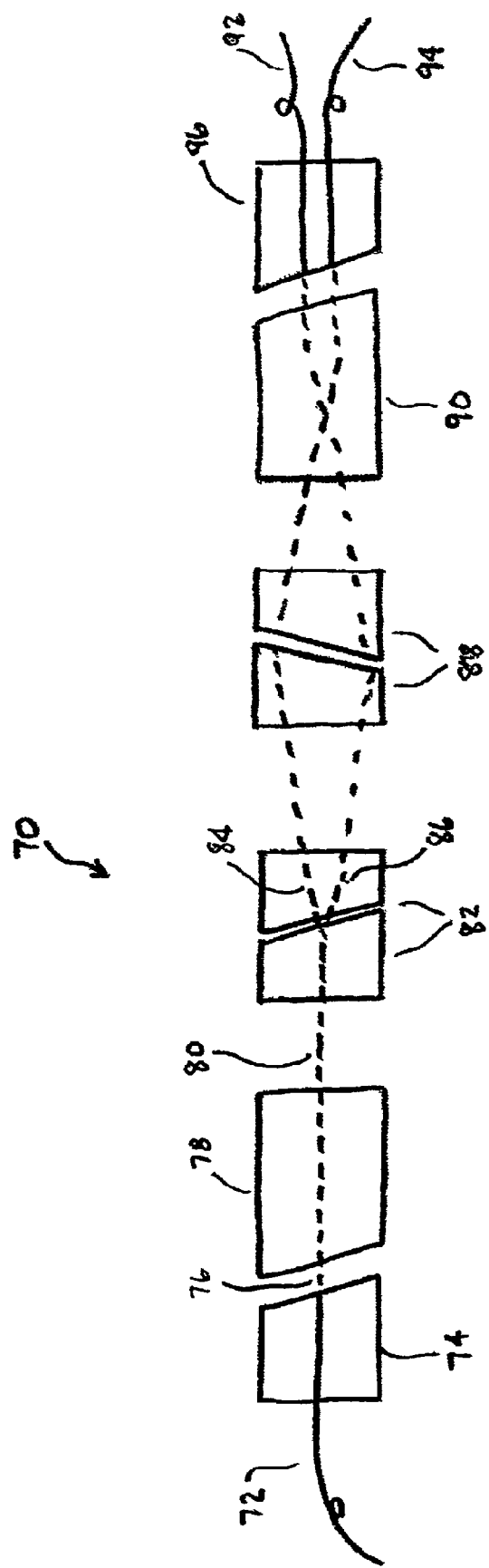
FIG. 5 is an optical block diagram of an optical polarization beam combiner/splitter in accordance with a third embodiment of the invention.

Referring now to FIG. 5, an optical block diagram of another embodiment of an optical polarized beam combiner/splitter 70 according to the present invention is shown.

As with the other embodiments disclosed herein, the embodiment of FIG. 5 has been described for an orientation wherein a coincident beam having two components enters from optical fiber 72 at the left of the figure and is split into two component beams which emerge at the right side of the figure, but persons of ordinary skill in the art will appreciate that the analysis of two component beams entering the combiner/splitter from the right and being combined and directed into optical fiber 72 according to the present invention follows from the same optical principles described as responsible for beam splitting, so long as the optical fibers delivering the two component beams are polarization maintaining fibers.

Optical fiber 72 is disposed in ferrule 74 as is known in the art and is end polished at an angle as is known in the art. Diverging composite optical beam 76 from the end of optical fiber 72 is collimated by collimating lens 78. Ferrule 74 may have a length of about 4 mm, and may be spaced from collimating lens 78 by about 0.1 mm. Collimated composite optical beam 80 enters first Wollaston prism 82. A first optical beam component transits prism 82 on beam path 84 and a second optical beam component transits crystal 82 on beam path 86. Beam paths 84 and 86 are substantially symmetrical about the optical axis of the first beam path 76 out of first fiber 72. First Wollaston prism 82 may have a length of about 2 mm, and may be spaced from collimating lens 78 by about 0.3 mm.

A second Wollaston prism 88 is disposed in the paths of optical beams 84 and 86 to bend the propagation directions of optical beams 84 and 86 towards each other so that they may be focussed by lens 90 such that they enter optical fibers 92 and 94, respectively, disposed in ferrule 96. As presently preferred, lens 90 comprises a GRIN lens, although a conventional lens may also be employed. Second Wollaston prism 88 may have a length of about 2 mm, and may, be spaced from first Wollaston prism 82 by about 4 mm. Lens 90 may have a length of about 5 mm, and may be spaced from second Wollaston prism 88 by about 0.3 mm. Ferrule 96 may have a length of about 4 mm, and may be spaced from lens 90 by about 0.1 mm.

Figure 6:
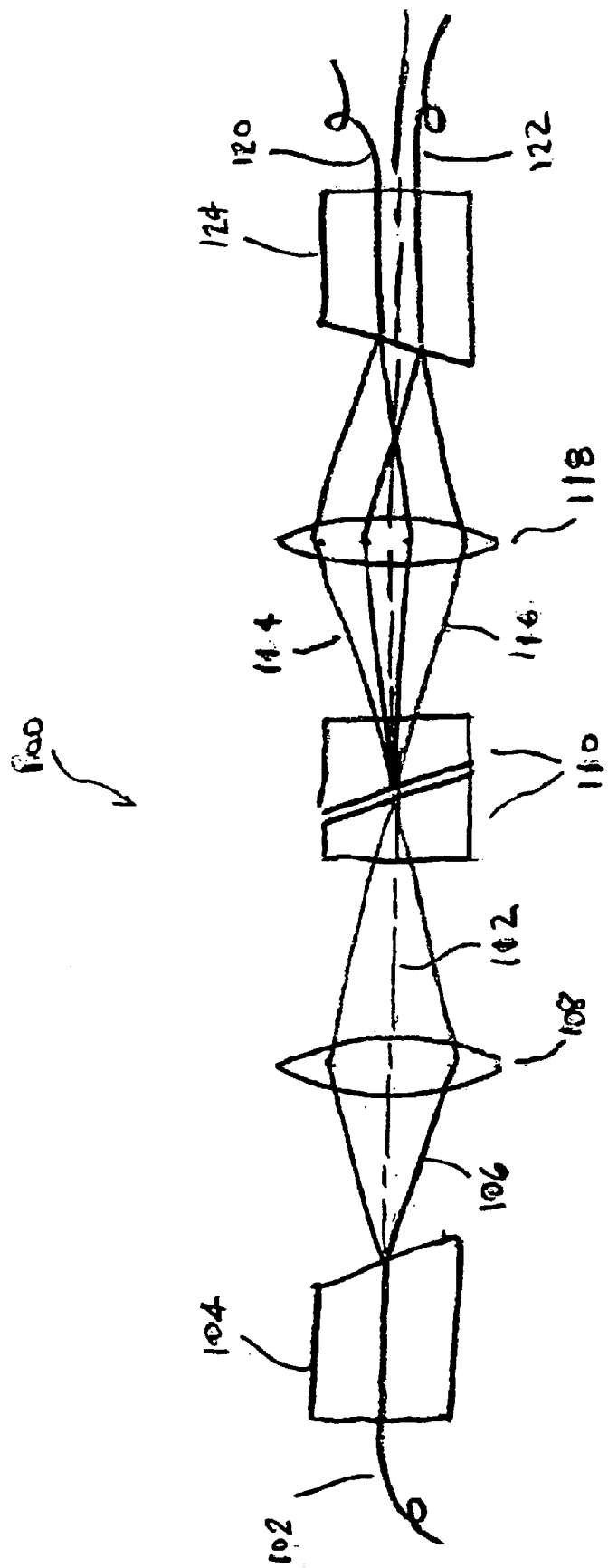
FIG. 6 is an optical block diagram of an optical polarization beam combiner/splitter in accordance with a fourth embodiment of the invention.

Referring now to FIG. 6, an optical block diagram of another embodiment of an optical polarized beam combiner/splitter 100 according to the present invention is shown.

As with the other embodiments disclosed herein, the embodiment of FIG. 6 has been described for an orientation wherein a coincident beam having two components enters from optical fiber 102 at the left of the figure and is split into two component beams which emerge at the right side of the figure, but persons of ordinary skill in the art will appreciate that the analysis of two component beams entering the combiner/splitter from the right and being combined and directed into optical fiber 102 according to the present invention follows from the same optical principles described as responsible for beam splitting, so long as the optical fibers delivering the two component beams are polarization maintaining fibers.

Optical fiber 102 is disposed in ferrule 104 as is known in the art and is end polished at an angle as is known in the art. Diverging composite optical beam 106 from the end of optical fiber 102 is focussed by lens 108 into Wollaston prism 110, disposed along the optical axis 112 of optical beam 106. Ferrule 104 may have a length of about 4 mm, and may be spaced from lens 108 by about 2 mm. Lens 108 may be spaced from Wollaston prism 110 by about 2 mm.

Wollaston prism 110 separates the composite optical beam 106 into component beams 114 and 116, which leave the Wollaston prism 110 at two different angles symmetrical about optical axis 112. Lens 118 focuses component optical beams 114 and 116 such that they enter optical fibers 120 and 122, respectively, disposed symmetrically about optical axis 112 in ferrule 124. As presently preferred, lenses 108 and 118 comprise conventional lenses. Wollaston prism 110 may have a length of about 4 mm, and may be spaced from lens 118 by about 2 mm. Lens 118 may be spaced from ferrule 124 by about 2 mm. Ferrule 124 may have a length of about 4 mm.

In the embodiment of FIG. 6, light coning out of the first fiber 102 is not collimated, but instead the two lenses are used as an imaging system to focus the light into Wollaston prism 110. One advantage of this embodiment is that only one Wollaston prism 110 is employed. This embodiment, however, requires the imaging lens to be aberation free, which is difficult to achieve for most common lenses.

As will be appreciated by persons of ordinary skill in the art having the benefit of this disclosure, the present invention provides advantages over prior art splitter/combiners. First, the embodiments of the present invention employ fewer optical parts compared to the prior art arrangements. In addition, the splitter/combiners of the present invention provide improved optical performance including benefits such as lower insertion loss and possibly higher optical polarization extinction ratio by using higher extinction ratio parts. Importantly, the present invention allows manufacture of splitter combiners having much smaller footprints than those of the prior art and permits use of compact coaxial packaging to permit easier fiber management. Because the optical path is epoxy free, higher optical power handling capability is enabled.

Persons of ordinary skill in the art will appreciate that, in embodiments where the optical axis of the input and output fibers are disposed at angles other than 0° and 90°, modified Wollaston prisms fabricated with their optical axes aligned with the optical axes of the input and output fibers will be employed. For example, in an embodiment where the two orthogonal optical axes are disposed at 45° and 135°, the Wollaston prism will have an optical axis disposed at an angle of 45°. This also applies to the walkoff crystals in the other embodiments.

Such skilled persons will also appreciate that the disclosed embodiments of the optical polarized beam combiner/splitter according to the present invention are more compact than those of the prior art. For example, the optical path length of the embodiment of FIG. 3 may be about 18 mm. The combined length of the elements in the optical path of the embodiment of FIG. 3 is less than about 32 mm. The entire packaged optical polarized beam combiner/splitter according to FIG. 3 of the present invention can fit in a package approximately 20 mm long having a diameter of about 5.5 mm.

The optical path length of the embodiment of FIG. 4 may be about 33 mm. The combined length of the elements in the optical path of the embodiment of FIG. 4 is less than about 32 mm. The entire packaged optical polarized beam combiner/splitter according to FIG. 4 of the present invention can fit in a package approximately 36 mm long having a diameter of about 5.5 mm.

The optical path length of the embodiment of FIG. 5 may be about 27 mm. The combined length of the elements in the optical path of the embodiment of FIG. 5 is less than about 26 mm. The entire packaged optical polarized beam combiner/splitter according to FIG. 5 of the present invention can fit in a package approximately 4 mm by 30 mm having a diameter of about 5.5 mm.

The optical path length of the embodiment of FIG. 6 may be about 28 mm. The combined length of the elements in the optical path of the embodiment of FIG. 6 is less than 20 mm. The entire packaged optical polarized beam combiner/splitter according to FIG. 6 of the present invention can fit in a package approximately 30 mm long having a diameter of about 5.5 mm.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An optical polarization beam splitter comprising:
   a first optical fiber having an end defining a first optical axis;
   a second optical fiber having an end defining a second optical axis;
   a third optical fiber having an end defining a third optical axis parallel to and spaced apart from said second optical axis;
   a collimating lens disposed along said first optical axis positioned to form collimated optical beam from said first optical fiber;
   a focusing lens disposed along a path of said collimated optical beam; and
   a birefringent walk-off crystal comprising:
      a first face adjacent to said focusing lens, said first face located at a focal plane of said focusing lens with an angle to said first optical axis to reduce an optical reflection; and
      a second face in contact with said ends of said second and third optical fibers; and
      a thickness between said first and second faces, wherein said thickness and said angle of the first face are selected such that a walk-off distance between the first component and the second component substantially matches a spacing between the second and third optical fibers, wherein a first component of said optical beam having a first polarization exiting said crystal at said second face enters said end of said second optical fiber along said second optical axis and a second component of said optical beam having a second polarization orthogonal to the polarization of said first polarization exiting said crystal at said second face enters said end of said third optical fiber along said third optical axis.

2. The optical polarization beam splitter of claim 1 wherein said second and third optical fibers are polarization maintaining fibers.

3. The optical polarization beam splitter of claim 1 wherein said second optical axis and said third optical axis are spaced apart by a distance of loss than 2 mm.

4. The optical polarization beam splitter of claim 1 disposed in a package having a length of less than about 50 mm and a diameter of less than about 10 mm.

5. The optical polarization beam splitter of claim 1 disposed in a package having a length of no more than about 20 mm and a diameter of no more than about 5.5 mm.

6. An optical polarization beam splitter comprising:
   a first optical fiber having an end defining a first optical axis;
   a second optical fiber having an end defining a second optical axis;
   a third optical fiber having an end defining a third optical axis parallel to and spaced apart from said second optical axis;

a collimating lens disposed along said first optical axis positioned to form a collimated optical beam from said first optical fiber;

a focusing lens disposed along a path of said collimated optical beam;

a birefringent walk-off crystal oriented such that said first optical axis is not normal to the crystal, the crystal comprising:

a first face adjacent to said focusing lens said first face located at a focal plane of said focusing lens with an angle to said first optical axis to reduce an optical reflection;

a second face in contact with said ends of said second and third optical fibers;

a thickness between said first and second faces selected such that a first component of said optical bean having a first polarization exiting said birefringent walk-off crystal at said second face enters said end of said second optical fiber along said second optical axis and a second component of said optical beam having a second polarization orthogonal to the polarization of said first polarization exiting said crystal at said second face enters said third optical fiber along said third optical axis; and wherein said thickness of said crystal and said orientation of said crystal are selected such that said first component and said second component walk off from one another by a distance that substantially matches a spacing between said second and third optical fiber.

7. The optical polarization beam splitter or claim 6 wherein said second and third optical fibers are polarization maintaining fibers.

8. The optical polarization beam splitter of claim 6 wherein said second optical axis and said third optical axis are spaced apart by a distance of less than 2 mm.

9. The optical polarization beam splitter of claim 6 disposed in a package having a length of less than about 50 mm and a diameter of less than about 10 mm.

10. The optical polarization beam splitter of claim 6 disposed in a package having a length of about 36 mm and a diameter of about 5.5 mm.

11. An optical polarization beam splitter comprising:

a first optical fiber having an end defining a first optical axis;

a second optical fiber having an end defining a second optical axis distinct from said first optical axis;

a third optical fiber having an end defining a third optical axis distinct from both said first and second optical axes, said third axis is parallel to and spaced apart from said second optical axis;

a collimating lens disposed along said first optical axis positioned to form a collimated optical beam from said first optical fiber;

a focusing lens disposed along a path of said collimated optical beam; and a birefringent walk-off crystal having a first face adjacent to said focusing lens and located at a focal plane of said focusing lens with an angle to said first optical axis to reduce an optical reflection and to select a walk-off distance of the crystal that substantially matches a spacing between the second and third optical fibers, and a second face in contact with said ends of said second and third optical fibers.

12. The optical polarization beam splitter of claim 11 wherein said birefringent walk-off crystal is oriented at a non-normal angle to said first optical axis.

13. The optical polarization beam splitter of claim 11 wherein said birefringent walk-off crystal is oriented such that a first component of said optical beam having a first polarization exiting said birefringent walk-off crystal at said second face enters said end of said second optical fiber along said second optical axis, and a second component of said optical beam having a second polarization orthogonal to the polarization of said first polarization exiting said crystal at said second face enters said third optical fiber along said third optical axis.

14. The optical polarization beam splitter of claim 13 wherein said second and third optical fibers are polarization maintaining fibers.

15. The optical polarization beam splitter of claim 13 wherein said second optical axis and said third optical axis are spaced apart by a distance of less than 2 mm.

16. The optical polarization beam splitter of claim 13 disposed in a package having a length of less than about 50 mm and a diameter of less than about 10 mm.

17. An optical polarization beam splitter comprising:

means for defining a first optical axis;

means for defining a second optical axis distinct from said first optical axis;

means for defining a third optical axis distinct from both said first and second optical axes, said third axis is parallel to and spaced apart from said second optical axis;

means for collimating an optical beam disposed along said first optical axis positioned to form a collimated optical beam from said first optical axis defining means;

means for focusing an optical beam disposed along a path of said collimating means; and means for refracting an optical beam into at least two components having orthogonal polarization components, said refracting means optically coupled with said first, said second, and said third optical axis defining means with an angle to said first optical axis to reduce an optical reflection, said angle selected such that the at least two components walk off by a distance substantially equal to a spacing between the first and second optical axis.

18. The optical polarization beam splitter of claim 17 wherein said refracting means is oriented at a non-normal angle to said first optical axis.

19. The optical polarization beam splitter of claim 17 wherein said second and third optical axis defining means are polarization maintaining fibers.

20. The optical polarization beam splitter of claim 17 wherein said second optical axis and said third optical axis are spaced apart by a distance of less than 2 mm.

21. The optical polarization beam splitter of claim 17 disposed in a package having a length of less than about 50 mm and a diameter of less than about 10 mm.

22. An optical polarization beam splitter comprising:

a first fiber ferrule having a first optical fiber;

a second fiber ferrule having a second optical fiber and a third optical fiber;

a birefringent crystal disposed on a face of the second fiber ferrule, the birefringent crystal hawing a thickness and an incident angle with respect to an optical axis of the first optical fiber, wherein the thickness and the incident angle of the crystal are selected such that a walk off distance of the crystal substantially matches a spacing between the second optical fiber and the third optical fiber;

a collimating lens that produces a collimated beam from an optical beam emerging from the first optical fiber; and a focusing lens that focuses the collimated beam on a first face of the crystal that is nearest the focusing lens such that a first component of the collimated beam enters the second optical fiber and a second component of the collimated bean enters the third optical fiber.

23. An optical polarization beam splitter as defined in claim 22, wherein the second optical fiber and the third optical fiber are polarization maintaining fibers.

24. An optical polarization beam splitter as defined in claim 22, wherein the first fiber ferrule has a length of about 4 mm and is spaced about 1 mm from the collimating lens, the collimating lens having a length of about 3 mm;

the focusing lens having a length of about 3 mm and spaced from the collimating lens by about 2 mm; and the crystal having a thickness in a range of about 1 mm to 2 mm and spaced from the focusing lens by about 1 mm.

* * * * *

UNITED STATES PATENT AND TRADEMARK OFFICE
CERTIFICATE OF CORRECTION

PATENT NO. : 6,859,316 B1
APPLICATION NO. : 09/702280
DATED : February 22, 2005
INVENTOR(S) : Huang et al.

It is certified that error appears in the above-identified patent and that said Letters Patent is hereby corrected as shown below:

<u>Cover Page</u>
Item 56, insert the following references:

U.S. PATENT DOCUMENTS
   4,570,064    2/1986    Nagatsuma et al...........250/231.1
   4,671,613    6/1987    Buhrer
   5,291,571    3/1994    Kunikane, et al. ................385/93
   6,014,256 *  1/2000    Cheng............................359/495

FOREIGN PATENT DOCUMENTS
   WO         WO 90/15357    12/1990
   EP          EP 0 863 425 A2  2/1998
   EP          EP 0 959 375 A2  5/1999

<u>Column 1</u>
Line 67, after "sufficient" insert --to--

<u>Column 3</u>
Line 38, change "sa the id" to --said--

<u>Column 4</u>
Line 27, change "nun" to --mm--

<u>Column 8</u>
Line 53, change "loss" to --less--

<u>Column 9</u>
Line 1, change "tens" to --lens--

UNITED STATES PATENT AND TRADEMARK OFFICE
CERTIFICATE OF CORRECTION

PATENT NO. : 6,859,316 B1
APPLICATION NO. : 09/702280
DATED : February 22, 2005
INVENTOR(S) : Huang et al.

It is certified that error appears in the above-identified patent and that said Letters Patent is hereby corrected as shown below:

Column 11
Line 10, change "bean" to --beam--

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

PATENT NO.        : 6,859,316 B1
APPLICATION NO. : 09/702280
DATED             : February 22, 2005
INVENTOR(S)       : Huang et al.

It is certified that error appears in the above-identified patent and that said Letters Patent is hereby corrected as shown below:

Cover Page
Item 56, insert the following references:

U.S. PATENT DOCUMENTS

| | | |
|---|---|---|
| 4,570,064 | 2/1986 | Nagatsuma et al............ 250/231.1 |
| 4,671,613 | 6/1987 | Buhrer |
| 5,291,571 | 3/1994 | Kunikane, et al. .................385/93 |
| 6,014,256 * | 1/2000 | Cheng ............................359/495 |

FOREIGN PATENT DOCUMENTS

| | | |
|---|---|---|
| WO | WO 90/15357 | 12/1990 |
| EP | EP 0 863 425 A2 | 2/1998 |
| EP | EP 0 959 375 A2 | 5/1999 |

Column 1
Line 67, after "sufficient" insert --to--

Column 3
Line 38, change "sa the id" to --said--

Column 4
Line 27, change "nun" to --mm--

Column 8
Line 53, change "loss" to --less--

Column 9
Line 1, change "tens" to --lens--

Column 11
Line 10, change "bean" to --beam--

UNITED STATES PATENT AND TRADEMARK OFFICE
CERTIFICATE OF CORRECTION

PATENT NO. : 6,859,316 B1
APPLICATION NO. : 09/702280
DATED : February 22, 2005
INVENTOR(S) : Huang et al.

It is certified that error appears in the above-identified patent and that said Letters Patent is hereby corrected as shown below:

<u>Column 12</u>
Line 2, after "wherein" insert --:--

Signed and Sealed this

Sixteenth Day of January, 2007

JON W. DUDAS
*Director of the United States Patent and Trademark Office*